United States Patent
Terry et al.

(10) Patent No.: US 10,172,048 B2
(45) Date of Patent: *Jan. 1, 2019

(54) SYSTEM FOR EFFICIENT RECOVERY OF NODE-B BUFFERED DATA FOLLOWING MAC LAYER RESET

(71) Applicant: InterDigital Technology Corporation, Wilmington, DE (US)

(72) Inventors: Stephen E. Terry, Northport, NY (US); Yi-Ju Chao, Minnetonka, MN (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,234

(22) Filed: Apr. 4, 2016

(65) Prior Publication Data

US 2016/0219468 A1 Jul. 28, 2016

Related U.S. Application Data

(63) Continuation of application No. 14/209,564, filed on Mar. 13, 2014, now Pat. No. 9,319,946, which is a
(Continued)

(51) Int. Cl.
*H04L 12/50* (2006.01)
*H04W 36/00* (2009.01)
(Continued)

(52) U.S. Cl.
CPC ...... *H04W 36/0072* (2013.01); *G06F 1/1626* (2013.01); *G06F 1/1639* (2013.01);
(Continued)

(58) Field of Classification Search
CPC ....... H04W 4/00; H04W 36/0072; H04J 3/16; H04J 3/22; G06F 1/1626; G06F 1/1639;
(Continued)

(56) References Cited

U.S. PATENT DOCUMENTS 5,471,207 A 11/1995 Zandi et al.
5,491,728 A 2/1996 Verhille et al.
(Continued)

FOREIGN PATENT DOCUMENTS

CN 1378357 11/2002
EP 1 233 638 8/2002
(Continued)

OTHER PUBLICATIONS

"MAC-hs Reset." 3GPP TSG RAN WG2#28, Kobe, Japan, Apr. 8-12, 2002, Tdoc R2-020752.
(Continued)

*Primary Examiner* — Hanh N Nguyen
(74) *Attorney, Agent, or Firm* — Volpe and Koenig, P.C.

(57) ABSTRACT

A method and system for the UE and RNC to reduce transmission latency and potentially prevent loss of PDUs upon a MAC-hs layer reset. The RNC generates a radio resource control (RRC) message with a MAC-hs reset indication. The MAC reset indication requires the UE to flush buffers for configured HARQ processes, disassemble MAC protocol data units (PDUs) in the reordering buffers, deliver MAC-d PDUs to a MAC-d layer, and configure the MAC-hs to receive new data.

12 Claims, 4 Drawing Sheets

Related U.S. Application Data continuation of application No. 12/767,463, filed on Apr. 26, 2010, now Pat. No. 8,693,435, which is a continuation of application No. 10/616,331, filed on Jul. 9, 2003, now Pat. No. 7,706,405.

(60) Provisional application No. 60/410,737, filed on Sep. 12, 2002.

(51) Int. Cl.

| | | |
|---|---|---|
| H04L 1/16 | (2006.01) | |
| H04L 1/18 | (2006.01) | |
| H04W 36/02 | (2009.01) | |
| H04L 29/06 | (2006.01) | |
| H04L 29/12 | (2006.01) | |
| H04L 12/58 | (2006.01) | |
| G06F 1/16 | (2006.01) | |
| G06F 21/30 | (2013.01) | |
| G06F 21/62 | (2013.01) | |
| G06F 21/74 | (2013.01) | |
| G06F 21/88 | (2013.01) | |
| G11B 20/10 | (2006.01) | |
| H03L 7/091 | (2006.01) | |
| H04B 7/26 | (2006.01) | |
| H04B 10/2575 | (2013.01) | |
| H04J 13/00 | (2011.01) | |
| H04J 13/16 | (2011.01) | |
| H04L 1/00 | (2006.01) | |
| H04L 9/08 | (2006.01) | |
| H04L 9/30 | (2006.01) | |
| H04L 12/46 | (2006.01) | |
| H04L 25/03 | (2006.01) | |
| H04L 25/49 | (2006.01) | |
| H04L 25/497 | (2006.01) | |
| H04L 27/156 | (2006.01) | |
| H04M 1/725 | (2006.01) | |
| H04M 7/12 | (2006.01) | |
| H04N 1/00 | (2006.01) | |
| H04N 1/32 | (2006.01) | |
| H04N 1/40 | (2006.01) | |
| H04N 5/225 | (2006.01) | |
| H04N 5/44 | (2011.01) | |
| H04N 5/46 | (2006.01) | |
| H04N 5/64 | (2006.01) | |
| H04N 5/76 | (2006.01) | |
| H04N 7/01 | (2006.01) | |
| H04N 7/16 | (2011.01) | |
| H04N 7/173 | (2011.01) | |
| H04N 9/31 | (2006.01) | |
| H04N 9/64 | (2006.01) | |
| H04N 9/79 | (2006.01) | |
| H04N 21/2543 | (2011.01) | |
| H04N 21/418 | (2011.01) | |
| H04N 21/433 | (2011.01) | |
| H04N 21/4623 | (2011.01) | |
| H04N 21/472 | (2011.01) | |
| H04N 21/61 | (2011.01) | |
| H04N 21/658 | (2011.01) | |
| H04Q 3/00 | (2006.01) | |
| H04W 4/14 | (2009.01) | |
| H04W 28/00 | (2009.01) | |
| H04W 52/30 | (2009.01) | |
| H04W 84/08 | (2009.01) | |
| H04L 12/24 | (2006.01) | |
| H04L 12/911 | (2013.01) | |
| H04L 12/919 | (2013.01) | |
| H04L 12/801 | (2013.01) | |
| H04N 19/139 | (2014.01) | |
| H04N 19/70 | (2014.01) | |
| H04N 19/51 | (2014.01) | |
| H04N 19/109 | (2014.01) | |
| H04N 19/91 | (2014.01) | |
| H04N 19/527 | (2014.01) | |
| H04N 19/517 | (2014.01) | |
| H04N 19/625 | (2014.01) | |
| H04W 36/04 | (2009.01) | |
| H04W 76/12 | (2018.01) | |
| H04L 12/26 | (2006.01) | |
| G11B 20/22 | (2006.01) | |
| H04M 3/42 | (2006.01) | |
| H04N 5/38 | (2006.01) | |
| H04N 5/445 | (2011.01) | |
| H04N 5/45 | (2011.01) | |
| H04N 5/66 | (2006.01) | |
| H04N 5/775 | (2006.01) | |
| H04N 5/85 | (2006.01) | |
| H04N 5/907 | (2006.01) | |
| H04N 9/804 | (2006.01) | |
| H04W 4/10 | (2009.01) | |
| H04W 4/12 | (2009.01) | |
| H04W 8/24 | (2009.01) | |
| H04W 8/26 | (2009.01) | |
| H04W 28/18 | (2009.01) | |
| H04W 28/26 | (2009.01) | |
| H04W 40/00 | (2009.01) | |
| H04W 72/04 | (2009.01) | |
| H04W 88/08 | (2009.01) | |
| H04W 88/16 | (2009.01) | |
| H04W 76/45 | (2018.01) | |
| H04W 76/30 | (2018.01) | |
| H04W 76/10 | (2018.01) | |

(52) U.S. Cl.
CPC ........ *G06F 21/305* (2013.01); *G06F 21/6209* (2013.01); *G06F 21/74* (2013.01); *G06F 21/88* (2013.01); *G11B 20/10009* (2013.01); *G11B 20/10425* (2013.01); *H03L 7/091* (2013.01); *H04B 7/2628* (2013.01); *H04B 10/25754* (2013.01); *H04J 13/0077* (2013.01); *H04J 13/16* (2013.01); *H04L 1/0066* (2013.01); *H04L 1/0068* (2013.01); *H04L 1/1685* (2013.01); *H04L 1/1812* (2013.01); *H04L 1/1841* (2013.01); *H04L 9/085* (2013.01); *H04L 9/304* (2013.01); *H04L 12/4641* (2013.01); *H04L 25/03038* (2013.01); *H04L 25/4902* (2013.01); *H04L 25/4904* (2013.01); *H04L 25/497* (2013.01); *H04L 27/156* (2013.01); *H04L 29/06027* (2013.01); *H04L 29/12471* (2013.01); *H04L 41/06* (2013.01); *H04L 47/15* (2013.01); *H04L 47/70* (2013.01); *H04L 47/72* (2013.01); *H04L 47/745* (2013.01); *H04L 47/765* (2013.01); *H04L 47/822* (2013.01); *H04L 47/824* (2013.01); *H04L 51/28* (2013.01); *H04L 51/38* (2013.01); *H04L 61/2553* (2013.01); *H04L 65/1006* (2013.01); *H04L 65/1043* (2013.01); *H04L 65/4061* (2013.01); *H04M 1/72533* (2013.01); *H04M 7/1295* (2013.01); *H04N 1/00957* (2013.01); *H04N 1/32106* (2013.01); *H04N 1/40* (2013.01); *H04N 5/2251* (2013.01); *H04N 5/2257* (2013.01); *H04N*

5/4401 (2013.01); *H04N 5/4448* (2013.01); *H04N 5/46* (2013.01); *H04N 5/64* (2013.01); *H04N 5/76* (2013.01); *H04N 7/0112* (2013.01); *H04N 7/163* (2013.01); *H04N 7/17327* (2013.01); *H04N 9/3129* (2013.01); *H04N 9/642* (2013.01); *H04N 9/7925* (2013.01); *H04N 19/109* (2014.11); *H04N 19/139* (2014.11); *H04N 19/51* (2014.11); *H04N 19/517* (2014.11); *H04N 19/527* (2014.11); *H04N 19/625* (2014.11); *H04N 19/70* (2014.11); *H04N 19/91* (2014.11); *H04N 21/2543* (2013.01); *H04N 21/4181* (2013.01); *H04N 21/433* (2013.01); *H04N 21/4623* (2013.01); *H04N 21/47211* (2013.01); *H04N 21/6175* (2013.01); *H04N 21/6187* (2013.01); *H04N 21/6582* (2013.01); *H04Q 3/0025* (2013.01); *H04W 4/14* (2013.01); *H04W 28/00* (2013.01); *H04W 36/02* (2013.01); *H04W 36/04* (2013.01); *H04W 52/30* (2013.01); *H04W 76/12* (2018.02); *H04W 84/08* (2013.01); *G06F 2221/2105* (2013.01); *G06F 2221/2115* (2013.01); *G11B 20/22* (2013.01); *H04L 43/0829* (2013.01); *H04L 51/04* (2013.01); *H04L 65/1016* (2013.01); *H04M 3/42221* (2013.01); *H04N 5/38* (2013.01); *H04N 5/445* (2013.01); *H04N 5/45* (2013.01); *H04N 5/66* (2013.01); *H04N 5/775* (2013.01); *H04N 5/85* (2013.01); *H04N 5/907* (2013.01); *H04N 7/0122* (2013.01); *H04N 9/8042* (2013.01); *H04N 2201/0094* (2013.01); *H04N 2201/3212* (2013.01); *H04N 2201/3222* (2013.01); *H04N 2201/3274* (2013.01); *H04W 4/10* (2013.01); *H04W 4/12* (2013.01); *H04W 8/245* (2013.01); *H04W 8/26* (2013.01); *H04W 28/18* (2013.01); *H04W 28/26* (2013.01); *H04W 40/00* (2013.01); *H04W 72/042* (2013.01); *H04W 76/10* (2018.02); *H04W 76/30* (2018.02); *H04W 76/45* (2018.02); *H04W 88/085* (2013.01); *H04W 88/16* (2013.01); *Y10S 370/906* (2013.01); *Y10S 370/907* (2013.01); *Y10S 707/99943* (2013.01)

(58) Field of Classification Search
CPC ... H04L 1/1845; H04L 1/1685; H04L 1/0066; H04L 1/1803
See application file for complete search history.

(56) References Cited

U.S. PATENT DOCUMENTS

| | | | |
|---|---|---|---|
| 5,673,307 | A | 9/1997 | Holland et al. |
| 5,751,719 | A | 5/1998 | Chen et al. |
| 5,940,381 | A | 8/1999 | Freeburg et al. |
| 5,940,769 | A | 8/1999 | Nakajima et al. |
| 5,974,036 | A | 10/1999 | Acharya et al. |
| 6,076,181 | A | 6/2000 | Cheng |
| 6,131,030 | A | 10/2000 | Schön et al. |
| 6,181,940 | B1 | 1/2001 | Rune |
| 6,230,013 | B1 | 5/2001 | Wallentin et al. |
| 6,233,454 | B1 | 5/2001 | Sato |
| 6,337,983 | B1 | 1/2002 | Bonta et al. |
| 6,385,184 | B2 | 5/2002 | Kitade et al. |
| 6,445,917 | B1 | 9/2002 | Bark et al. |
| 6,466,556 | B1 | 10/2002 | Boudreaux |
| 6,493,541 | B1 | 12/2002 | Gunnarsson et al. |
| 6,507,572 | B1 | 1/2003 | Kumar et al. |
| 6,532,364 | B1 | 3/2003 | Uchida et al. |
| 6,546,001 | B1 | 4/2003 | Semper et al. |
| 6,553,015 | B1 | 4/2003 | Sato |
| 6,553,231 | B1 | 4/2003 | Karlsson et al. |
| 6,567,670 | B1 | 5/2003 | Petersson |
| 6,621,793 | B2 | 9/2003 | Widegren et al. |
| 6,678,249 | B2 | 1/2004 | Toskala et al. |
| 6,681,112 | B1 | 1/2004 | Schwarz et al. |
| 6,717,927 | B2 | 4/2004 | Chao et al. |
| 6,744,778 | B1 | 6/2004 | Allpress et al. |
| 6,839,329 | B1 | 1/2005 | Sato et al. |
| 6,842,445 | B2 | 1/2005 | Ahmavaara et al. |
| 6,901,063 | B2 * | 5/2005 | Vayanos ............... H04L 1/1845 370/335 |
| 6,975,881 | B2 | 12/2005 | Sheynman et al. |
| 6,987,981 | B2 | 1/2006 | Kuo |
| 7,010,318 | B2 | 3/2006 | Chang et al. |
| 7,054,633 | B2 | 5/2006 | Seo et al. |
| 7,146,135 | B2 | 12/2006 | Agin |
| 7,286,563 | B2 * | 10/2007 | Chang ................... H04L 1/1803 370/342 |
| 7,706,405 | B2 * | 4/2010 | Terry ..................... H04L 1/1685 370/329 |
| 7,768,962 | B2 | 8/2010 | Kubota et al. |
| 8,085,728 | B2 | 12/2011 | Chao et al. |
| 8,085,729 | B2 | 12/2011 | Chao et al. |
| 8,693,435 | B2 * | 4/2014 | Terry ..................... H04L 1/1685 370/331 |
| 9,319,946 | B2 * | 4/2016 | Terry ..................... H04L 1/0066 |
| 2001/0010687 | A1 | 8/2001 | Lee et al. |
| 2001/0012279 | A1 | 8/2001 | Haumont et al. |
| 2001/0021180 | A1 | 9/2001 | Lee et al. |
| 2001/0032325 | A1 | 10/2001 | Fong et al. |
| 2001/0046211 | A1 | 11/2001 | Maruwaka et al. |
| 2002/0001296 | A1 | 3/2002 | Lee et al. |
| 2002/0075867 | A1 | 6/2002 | Herrmann |
| 2002/0107019 | A1 | 8/2002 | Mikola et al. |
| 2002/0110095 | A1 | 8/2002 | Jiang et al. |
| 2003/0016698 | A1 | 1/2003 | Chang et al. |
| 2003/0039270 | A1 | 2/2003 | Chang et al. |
| 2003/0147370 | A1 | 8/2003 | Wu |
| 2003/0189909 | A1 | 10/2003 | Chao et al. |
| 2004/0179619 | A1 | 9/2004 | Tian et al. |
| 2004/0229626 | A1 | 11/2004 | Yi et al. |
| 2005/0281222 | A1 | 12/2005 | Ranta-Aho et al. |
| 2006/0034204 | A1 | 2/2006 | Lee et al. |
| 2007/0121542 | A1 | 5/2007 | Lohr et al. |

FOREIGN PATENT DOCUMENTS

| | | |
|---|---|---|
| EP | 1 263 159 | 12/2002 |
| JP | 11-331208 | 11/1999 |
| JP | 2000-59459 | 2/2000 |
| JP | 2000-115059 | 4/2000 |
| JP | 2001-148879 | 5/2001 |
| KR | 2001-0026301 | 4/2001 |
| RU | 2000118981 | 7/2002 |
| TW | 352496 | 2/1999 |
| WO | 00/18051 | 3/2000 |
| WO | 00/74341 | 12/2000 |
| WO | 01/05121 | 1/2001 |
| WO | 01/39408 | 5/2001 |
| WO | 01/50672 | 7/2001 |
| WO | 02/01769 | 1/2002 |
| WO | 02/01893 | 1/2002 |
| WO | 02/037872 | 5/2002 |
| WO | 02/49372 | 6/2002 |
| WO | 02/069519 | 9/2002 |
| WO | 02/069547 | 9/2002 |
| WO | 03/005629 | 1/2003 |

OTHER PUBLICATIONS

"RLC Status Upon Handover for Efficient Recovery of Node-B Buffered Data." 3GPP TSG RAN WG2#31, Stockholm, Sweden, Aug. 19-23, 2002, Tdoc R2-021998.

3GPP, "3rd Generation Partnership Project; Technical Specification Group Radio Access Network; MAC Protocol Specification (Release 5)." 3GPP TS 25.321, v5.1.0, Jun. 2006.

(56) References Cited

OTHER PUBLICATIONS

3GPP, "3rd Generation Partnership Project; Technical Specification Group Radio Access Network; High Speed Downlink Packet Access (HSDPA); Overall Description; Stage 2 (Release 5)." 3GPP TS 25.308, v5.2.0, Mar. 2002.
3GPP, "3rd Generation Partnership Project; Technical Specification Group Radio Access Network; High Speed Downlink Packet Access (HSDPA); Overall Description; Stage 2 (Release 5)." 3GPP TS 25.308, v5.4.0, Mar. 2003.
3GPP, "3rd Generation Partnership Project; Technical Specification Group Radio Access Network; MAC Protocol Specification (Release 5)," 3GPP TS 25.321, V5.5.0 (Jun. 2003).
3GPP, "3rd Generation Partnership Project; Technical Specification Group Radio Access Network; MAC Protocol Specification (Release 4)," 3GPP TS 25.321, V4.8.0 (Mar. 2003).
3GPP, "3rd Generation Partnership Project; Technical Specification Group Radio Access Network; MAC Protocol Specification (Release 4)," 3GPP TS 25.321, V4.5.0 (Jun. 2002).
3GPP, "3rd Generation Partnership Project; Technical Specification Group Radio Access Network; MAC Protocol Specification (Release 1999)," 3GPP TS 25.321, V3.15.0 (Mar. 2003).
3GPP, "3rd Generation Partnership Project; Technical Specification Group Radio Access Network; MAC Protocol Specification (Release 1999)," 3GPP TS 25.321, V3.12.0 (Jun. 2002).
3GPP, "3rd Generation Partnership Project; Technical Specification Group Radio Access Network; Radio Resource Control (RRC); Protocol Specification (Release 1999)," 3GPP TS 25.331 V3.11.0 (Jun. 2002).
3GPP, "3rd Generation Partnership Project; Technical Specification Group Radio Access Network; Radio Resource Control (RRC); Protocol Specification (Release 1999)," 3GPP TS 25.331 V3.15.0 (Jun. 2003).
3GPP, "3rd Generation Partnership Project; Technical Specification Group Radio Access Network; Radio Resource Control (RRC); Protocol Specification (Release 4)," 3GPP TS 25.331 V4.5.0 (Jun. 2002).
3GPP, "3rd Generation Partnership Project; Technical Specification Group Radio Access Network; Radio Resource Control (RRC); Protocol Specification (Release 4)," 3GPP TS 25.331, V4.10.0 (Jun. 2003).
3GPP, "3rd Generation Partnership Project; Technical Specification Group Radio Access Network; Radio Resource Control (RRC); Protocol Specification (Release 5)," 3GPP TS 25.331 V5.1.0 (Jun. 2002).
3GPP, "3rd Generation Partnership Project; Technical Specification Group Radio Access Network; Radio Resource Control (RRC); Protocol Specification (Release 5)," 3GPP TS 25.331 V5.5.0 (Jun. 2003).
3GPP, "3rd Generation Partnership Project; Technical Specification Group Radio Access Network; Radio Link Control (RLC) Protocol Specification (Release 1999)," 3GPP TS 25.322 V3.11.0 (Jun. 2002).
3GPP, "3rd Generation Partnership Project; Technical Specification Group Radio Access Network; Radio Link Control (RLC) Protocol Specification (Release 1999)," 3GPP TS 25.322 V3.15.0 (Jun. 2003).
3GPP, "3rd Generation Partnership Project; Technical Specification Group Radio Access Network; Radio Link Control (RLC) Protocol Specification (Release 4)," 3GPP TS 25.322 V4.5.0 (Jun. 2002).
3GPP, "3rd Generation Partnership Project; Technical Specification Group Radio Access Network; Radio Link Control (RLC) Protocol Specification (Release 4)," 3GPP TS 25.322 V4.9.0 (Jun. 2003).
3GPP, "3rd Generation Partnership Project; Technical Specification Group Radio Access Network; Radio Link Control (RLC) Protocol Specification (Release 5)," 3GPP TS 25.322 V5.1.0 (Jun. 2002).
3GPP, "3rd Generation Partnership Project; Technical Specification Group Radio Access Network; Radio Link Control (RLC) Protocol Specification (Release 5)," 3GPP TS 25.322 V5.5.0 (Jun. 2003).
3GPP, "3rd Generation Partnership Project; Technical Specification Group Services and System Aspects; General Packet Radio Service (GPRS); Service Description; Stage 2 (Release 1999)," 3GPP TS 23.060 V3.12.0 (Jun. 2002).
3GPP, "3rd Generation Partnership Project; Technical Specification Group Services and System Aspects; General Packet Radio Service (GPRS); Service Description; Stage 2 (Release 1999)," 3GPP TS 23.060 V3.15.0 (Jun. 2003).
3GPP, "3rd Generation Partnership Project; Technical Specification Group Services and System Aspects; General Packet Radio Service (GPRS); Service Description; Stage 2 (Release 4)," 3GPP TS 23.060 V4.5.0 (Jun. 2002).
3GPP, "3rd Generation Partnership Project; Technical Specification Group Services and System Aspects; General Packet Radio Service (GPRS); Service Description; Stage 2 (Release 4)," 3GPP TS 23.060 V4.8.0 (Jun. 2003).
3GPP, "3rd Generation Partnership Project; Technical Specification Group Services and System Aspects; General Packet Radio Service (GPRS); Service Description; Stage 2 (Release 5)," 3GPP TS 23.060 V5.2.0 (Jun. 2002).
3GPP, "3rd Generation Partnership Project; Technical Specification Group Services and System Aspects; General Packet Radio Service (GPRS); Service Description; Stage 2 (Release 5)," 3GPP TS 23.060 V5.6.0 (Jun. 2003).
3GPP, "3rd Generation Partnership Project; Technical Specification Group Services and System Aspects; General Packet Radio Service (GPRS); Service Description; Stage 2 (Release 6)," 3GPP TS 23.060 V6.1.0 (Jun. 2003).
Interdigital, "Inter-Node B (Intra-RNS) Hard Handover," 3GPP TSG-RAN Working Group 3, TSGW3#4(99)532 (Jun. 1-4, 1999).
Motorola, "HS-DSCH Cell Change", TSG-RAN Working Group 2 Meeting #24, R2-012391, (New York, Oct 22-26, 2001).
Third Generation Partnership Project, "Technical Specification Group Radio Access Network; RLC Protocol Specification (3G TS 25.322 version 3.0.0)," 3G TS 25.322 V3.0.0 (Oct. 1999).
Third Generation Partnership Project, "Technical Specification Group Radio Access Network; Radio Interface Protocol Architecture (3G TS 25.301 version 3.3.0)," 3G TS 25.301 V3.3.0 (Dec. 1999).
Third Generation Partnership Project, "Technical Specification Group Radio Access Network; Radio Interface Protocol Architecture (Release 1999)," 3GPP TS 25.301 V3.10.0 (Jun. 2002).
Third Generation Partnership Project, "Technical Specification Group Radio Access Network; Radio Interface Protocol Architecture (Release 1999)," 3GPP TS 25.301 V3.11.0 (Sep. 2002).
Third Generation Partnership Project, "Technical Specification Group Radio Access Network; Radio Interface Protocol Architecture (Release 4)," 3GPP TS 25.301 V4.3.0 (Jun. 2002).
Third Generation Partnership Project, "Technical Specification Group Radio Access Network; Radio Interface Protocol Architecture (Release 4)," 3GPP TS 25.301 V4.4.0 (Sep. 2002).
Third Generation Partnership Project, "Technical Specification Group Radio Access Network; Radio Interface Protocol Architecture (Release 5)," 3GPP TS 25.301 V5.1.0 (Jun. 2002).
Third Generation Partnership Project, "Technical Specification Group Radio Access Network; Radio Interface Protocol Architecture (Release 5)," 3GPP TS 25.301 V5.2.0 (Sep. 2002).

* cited by examiner

SYSTEM FOR EFFICIENT RECOVERY OF NODE-B BUFFERED DATA FOLLOWING MAC LAYER RESET

CROSS REFERENCE TO RELATED APPLICATIONS

This application is a continuation of U.S. patent application Ser. No. 14/209,564 filed Mar. 13, 2014, which is a continuation of U.S. patent application Ser. No. 12/767,463 filed on Apr. 26, 2010, which issued on Apr. 8, 2014 as U.S. Pat. No. 8,693,435, which is a continuation of U.S. patent application Ser. No. 10/616,331 filed on Jul. 9, 2003, which issued on Apr. 27, 2010 as U.S. Pat. No. 7,706,405, which claims the benefit of U.S. Provisional Patent Application No. 60/410,737 filed on Sep. 12, 2002, the contents of which are hereby incorporated by reference herein.

FIELD OF INVENTION

The present invention relates to the field of wireless communications. More specifically, the present invention relates to efficient recovery of data transmission between a pair of Layer 2 automatic repeat request (ARQ) peer entities following MAC layer reset of an intermediate node from where data transmissions are distributed. One such example of this handover scenario is a system employing hybrid ARQ (H-ARQ) and adaptive modulation and coding (AM&C) techniques.

BACKGROUND

A third generation (3G) Universal Terrestrial Radio Access Network (UTRAN) comprises several radio network controllers (RNCs), each of which is associated with one or more Node Bs, and each Node B is associated with one or more cells.

The 3G FDD and TDD systems typically use the RNC to distribute, (i.e., buffer and schedule), data transmissions to the UE. However, for the high speed channels of 3G cellular systems, data is distributed by the Node B. One of these high speed channels, for example, is the High Speed Downlink Shared Channel (HS-DSCH). Since data is distributed by the Node B, it is necessary to buffer data for transmission in Node B. When the distributing entity (Node B) to which the UE is attached changes, there is a potential loss of data buffered in the distributing entity. The RNC does not have an up-to-date status of the transmissions of Packet Data Units (PDUs) since data is distributed by the intermediate point (Node B). It is necessary for the UE to detect the data loss and request retransmission, such as with a Status PDU, of lost PDUs from the RNC. If the generation of the Status PDU is delayed, as a consequence, the latency of data retransmission may be large and may not satisfy QoS requirements.

This problem is aggravated in the HS-DSCH case since there are several Node Bs associated with each RNC and there is a much higher likelihood that a mobile UE will require a Node B change than a change of RNC as a result of UE cell handovers.

The HS-DSCH utilizes AMC to enable high-speed transmission of data and utilizes H-ARQ to increase the possibility of successful delivery of data. A serving HS-DSCH cell change is when the UE has to change the cell associated with the UTRAN access point that is performing transmission and reception of the serving HS-DSCH radio link. The serving HS-DSCH cell change is invoked when improved physical channel conditions and/or improved physical capacity is realized in an alternate cell.

There are two types of serving HS-DSCH cell changes. An Intra-Node B serving HS-DSCH cell change is when the UE changes between two cells that are associated with the same Node B. An Inter-Node B serving HS-DSCH cell change is when the UE changes between two cells that are associated with different Node Bs. In an Inter-Node B cell change, the Node B before the serving HS-DSCH cell change is called the source Node B and the Node B after the serving HS-DSCH cell change is called the target Node B.

There are peer Radio Link Control (RLC) entities in both the RNC and the UE. The sending RLC entity signals a sequence number (SN) in the PDU header, which is used by the receiving RLC entity to ensure that no PDUs are missed in the transmission. If there are PDUs missed during the transmission, realized by out-of-sequence delivery of PDUs, the receiving RLC entity sends a status report PDU to inform the sending RLC entity that certain PDUs are missing. The status report PDU describes the status of the successful and/or unsuccessful data transmissions. It identifies the SNs of the PDUs that are missed or received. If a PDU is missed, the sending RLC entity will retransmit a duplicate of the missed PDU to the receiving RLC.

It is also possible for the sending RLC entity to poll for a status report PDU from the receiving RLC entity. The polling function provides a mechanism for the sending RLC entity to request the status of PDU transmissions. Although the H-ARQ operation removes some failed transmissions and increases the probability of successful delivery of data, it is the RLC protocol layer that ultimately ensures successful delivery.

Due to dynamic changes in propagation conditions, the HS-DSCH cell change must be performed rapidly to maintain quality of service. During the serving HS-DSCH cell change, it is possible that the UE stops transmission and reception in the source cell before all PDUs currently stored in the source Node B are successfully transmitted. Since the source Node B performs scheduling and buffering of the data, and since the data rates are very high, (for example 10 Mb/sec or higher), when the UE performs a serving HS-DSCH cell change (especially for an Inter-Node B handover) there is a possibility that considerable amounts of data buffered in the source Node B will be lost. One reason for this data loss is that no mechanism exists within the UTRAN architecture for data buffered at the source Node B to be transferred to the target Node B. Upon a serving HS-DSCH cell change, the RNC has no information on how much, if any, data is lost since the RNC has no way to know what data is buffered in the source Node B.

There are currently two ways that prior art systems handle the recovery of data buffered at the source Node B. Following the HS-DSCH cell change: 1) the RNC can explicitly poll for a status PDU from the UE; or 2) the RNC can start transmitting in the target cell and the out-of-sequence delivery realized by the UE will generate the status PDU.

In the first case, where the RNC explicitly polls for a status PDU, the RNC must first wait until the physical channel is established in the new cell. The status PDU request is then sent and is received and processed by the UE. The UE generates the status PDU and sends it back to the RNC, which processes the status PDU and determines which PDUs are in need of retransmission.

In the second case, where the RNC just starts transmitting PDUs from where it stopped in the source cell, the UE recognizes the out-of-sequence delivery of data and generates a status PDU back to the RNC. The RNC processes the status PDU and learns which PDUs are in need of retransmission.

In either of these two cases, if data buffered in the source Node B needs to be recovered, then a status PDU will be processed, but proper reception of data retransmitted by the UE will be considerably delayed. This is due to delayed generation of the status PDU by the UE and reception of the status PDU in the RNC. If transmission is being performed in the RLC acknowledged mode, data is not passed to higher layers until in-sequence delivery of data can be performed. Accordingly, the UE will be required to buffer the out-of-sequence data until the missing PDUs can be retransmitted. This not only results in a delay of the transmission, but requires the UE to have a memory capable of data buffering for continuous data reception until the missed data can be successfully retransmitted. Otherwise the effective data transmission rate is reduced, thereby effecting quality of service. Since memory is very expensive, this is an undesirable design constraint.

Another problem encountered with handover is the data that is buffered within the UE. Within the MAC layer, there are typically a number of H-ARQ processors that perform H-ARQ processing. As shown in FIG. 1, H-ARQ processing is a scheme comprising multiple parallel H-ARQ processors on the transmitting side ($P1_B$-$P5_B$) and corresponding multiple parallel H-ARQ processors on the receiving side ($P1_{UE}$-$P5_{UE}$). Each processor pair, (for example $P1_B$ and $P1_{UE}$), repeatedly and sequentially attempt transmission of a data block until the transmission is successful, to ensure that each block of data is received without an error. For each data block, the time required to achieve successful H-ARQ transmission varies. Since several data blocks are processed in parallel, it is possible that the sequence of transmission is not maintained. Therefore, once a data block is received successfully by the receiving H-ARQ processor, the data block is forwarded to a reordering buffer to provide in-sequence delivery to the RLC layer. The reordering buffers will reorder the data blocks based on their transmission sequence numbers before forwarding them to the RLC layer.

During Inter-Node B or Intra-Node B handovers, the RRC messages often carry a MAC layer reset indicator to the UE. Upon receiving a MAC layer reset indicator, the UE performs a sequence of functions including, but not limited to, flushing out buffers for all configured H-ARQ processes, (i.e. flushing out the reordering buffers by disassembling all MAC-hs layer PDUs in the reordering buffers into MAC-d layer PDUs and delivering all MAC-d layer PDUs to the MAC-d layer and then to its associated RLC entities). Upon Inter-Node B handovers (and some Intra Node B handovers), it is necessary to reset the MAC-hs layer in the UE such that all H-ARQ processes and all the reordering buffers are reset for data reception from a new MAC-hs entity of the target Node B.

After a serving HS-DSCH cell change, the correct status of successful or unsuccessful received PDUs cannot be obtained until the procedure of the MAC layer reset is completed and the data blocks are processed by the RLC.

It would be desirable to have a system and method where data buffered in the UE can be accounted for in order to properly maintain user quality of service requirements.

SUMMARY

The present invention is a method and system for the UE and RNC to perform a series of actions in order to reduce transmission latency and potentially prevent loss of PDUs upon a MAC layer reset. UE generation of the status PDU is coupled with the MAC layer reset. The RNC generates a signaling message with a MAC reset indication. Following the MAC layer reset due to reception of a MAC layer reset request, all PDUs stored in the UE MAC layer reordering buffers are flushed to RLC entities and then processed by RLC entities prior to the generation of a PDU status report. The PDU status report provides the status of all successfully received PDUs to the RNC. This provides fast generation of a PDU status report. Upon reception of a PDU status report in the RNC, missing PDUs are realized and retransmitted to the UE.

DETAILED DESCRIPTION OF THE PREFERRED EMBODIMENTS

Figure 1:
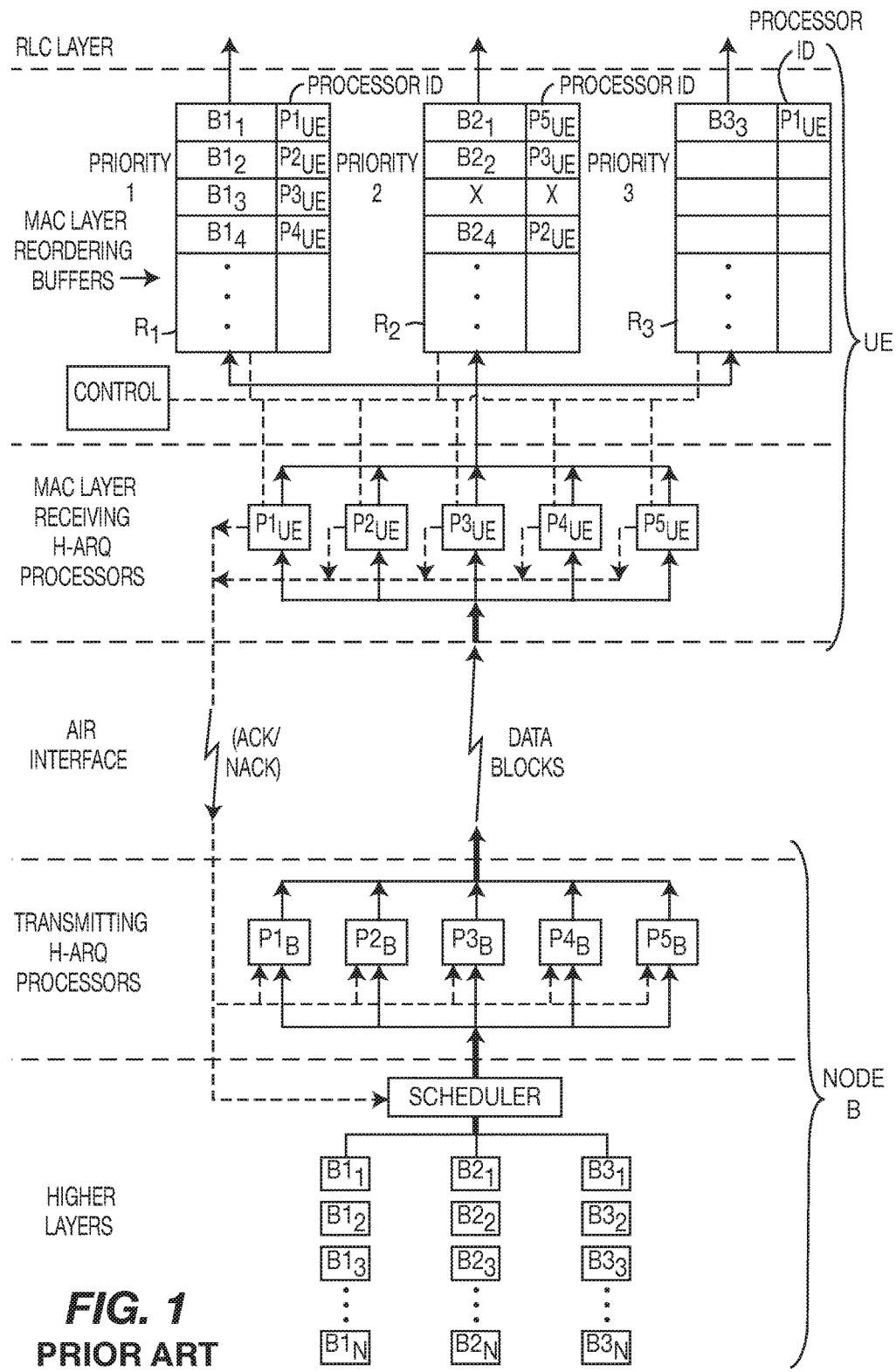
FIG. 1 is a block diagram of a prior art H-ARQ process.

The preferred embodiments of the present invention will be described with reference to the drawing figures wherein like numerals represent like elements throughout.

Figure 2:
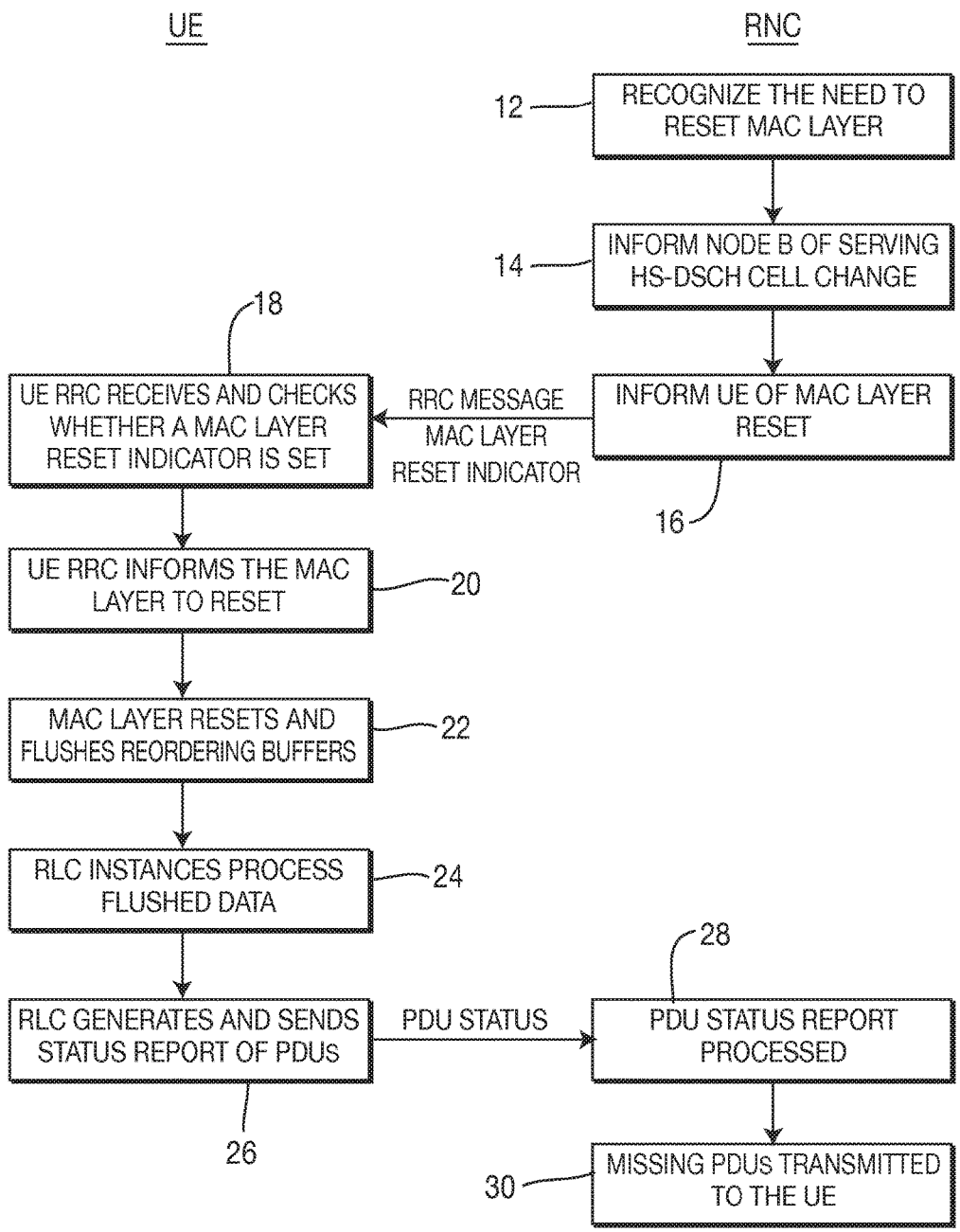
FIG. 2 is a flow diagram of an efficient procedure in accordance with the present invention for efficient recovery of UE buffered data following an HS-DSCH cell change.

Referring to the flow diagram of FIG. 2, a first embodiment of the present invention which comprises a method 10 of determining the status of the PDU transmissions to the UE with minimal delay following a MAC layer reset condition is shown. The procedure commences with the RNC recognizing the need to reset the UE MAC layer (step 12).

One possible cause for a UE MAC layer reset is in the event of a serving HS-DSCH cell change. The RNC informs the Node B of the HS-DSCH cell change (step 14) in the case of an Inter-Node B serving HS-DSCH cell change, and also in the case of an Intra-Node B serving HS-DSCH cell change where the source Node B is the same as the target Node B, but where transmission queues cannot be rerouted from the source to target cell. In both of these cases, a MAC reset is required. Along with the HS-DSCH cell change indication, the UE is informed of the MAC layer reset requirement by the RNC, as indicated via a Radio Resource Control (RRC) message (step 16). It should be noted that it is also possible to invoke step 16 in advance of step 14 with no adverse consequences.

Those of skill in the art would realize that there are many causes for a MAC layer reset other than the HS-DSCH cell change, where the method 10 for the RNC to determine PDU transmission status following MAC reset applies. For example, a MAC layer reset may be warranted any time the Node B H-ARQ processes need to be reinitialized.

Within the RRC message, there is an identifier for the MAC layer to perform a reset. This identifier may be part of the serving HS-DSCH cell change procedure, or may be part of any other procedure that results in resetting of the MAC layer in Node B and the UE in either an Inter-Node B cell change or an Intra-Node B cell change. It would be understood by those of skill in the art that there are many aspects to the MAC layer, including the MAC-hs layer and the MAC-d layer. For simplicity in describing the present invention, reference will be made hereinafter generally to the MAC layer.

The HS-DSCH is a data transport channel. For each data transport channel, there can be a plurality of RLC instances. The RLC instances are essentially logical channels which may be mapped to the same transport channel; for example, several RLC entities may be mapped to a single transport channel HS-DSCH. An RLC instance is called Acknowledged Mode (AM) if ARQ is used to ensure correct transmission between the peer RLC instances. A pair of AM RLC entities uses status PDUs for the receiver to indicate to the sender the status of successful transmissions of PDUs. Following the occurrence of the HS-DSCH cell change and a MAC layer reset, each of the AM RLC instances associated with a particular HS-DSCH generate a status PDU.

The RRC message along with the MAC layer reset indicator is received and processed by the RRC in the UE (step 18). The UE RRC checks whether a MAC layer reset indicator is set and, if so, the RRC informs the MAC layer of the MAC layer reset request (step 20). Upon reception of the MAC layer reset request, the MAC layer resets and in addition to other tasks, flushes all PDUs stored in its reordering buffers to the RLC instances mapped to the HS-DSCH (step 22). All flushed PDUs are then processed by the RLC instances mapped to HS-DSCH (step 24) before generation of a PDU status report (step 26).

RLC processing of PDUs stalled in reordering buffers before the generation of a PDU status report is necessary to provide accurate and complete transmission status to the RNC. If PDU status reports are generated early, (i.e. before all PDUs buffered in MAC reordering queues are processed by the RLC instances), some PDUs may be incorrectly indicated as not being received, and as a result unnecessary PDU retransmissions may be generated by the RNC.

There are several ways to ensure that all PDUs have been processed by the RLC so that the AM RLC entities will be able to obtain the correct status of all successfully received PDUs. First, the MAC layer forwards PDUs in-sequence from each reordering queue and then generates an "end-of-PDU" indication for each reordering queue.

In a second alternative, the last PDU from each reordering queue has a special indicator. These are reports of the status of the RLC PDUs received in the UE.

In a third alternative, the RLC confirms to the MAC layer when PDUs have been processed, and following the processing of all PDUs, the MAC layer generates a PDU status request to the RLC. It should be understood that there are numerous ways to coordinate processing between the MAC layer and the RLC to ensure all PDUs are processed by the RLC before generation of the PDU status message.

After receiving and processing the PDUs, the AM RLC generates a PDU status report (step 26) which indicates all successfully or unsuccessfully received PDUs. The PDU status report is generated for each AM RLC instance mapped to the HS-DSCH. A PDU status report may be generated even though no PDUs were forwarded from the MAC layer for that AM RLC instance. The UE then autonomously sends the PDU status report for each AM RLC instance associated with the HS-DSCH to the RNC.

In the RNC, assuming that the AM RLC and MAC entities are not informed to stop transmitting PDUs due to the MAC layer reset, the RNC continues to transmit PDUs regardless of the MAC layer reset. Upon reception of the PDU status report for each AM RLC instance associated with the HS-DSCH, the RLC instances in the RNC process the status reports (step 28) to determine lost PDUs and generate PDU retransmissions as necessary to ensure successful delivery (step 30). To achieve quality of service requirements, the retransmissions may take precedence over current transmission processing.

It should be understood that the need for the MAC layer reset is common with the need to generate a PDU status report. Indication of either requirement, or some common indication, can be signaled to the UE to invoke both the MAC layer reset and generation of the PDU status report. The UE will then perform each function in the sequence described.

This first embodiment of the present invention as shown in FIG. 2 permits the RNC to keep transmitting to the UE while the data path is switched from one radio link to another. However, in accordance with two alternative embodiments of the present invention, shown in FIGS. 3 and 4, data transmissions are halted upon an HS-DSCH cell change or other events that result in the need for MAC layer reset until the occurrence of a subsequent event. It should be noted that the steps shown in FIGS. 3 and 4 which have the same element numbers as the steps shown in FIG. 2 are identical. Accordingly, the description of those steps will not be repeated when referring to FIGS. 3 and 4.

Figure 3:
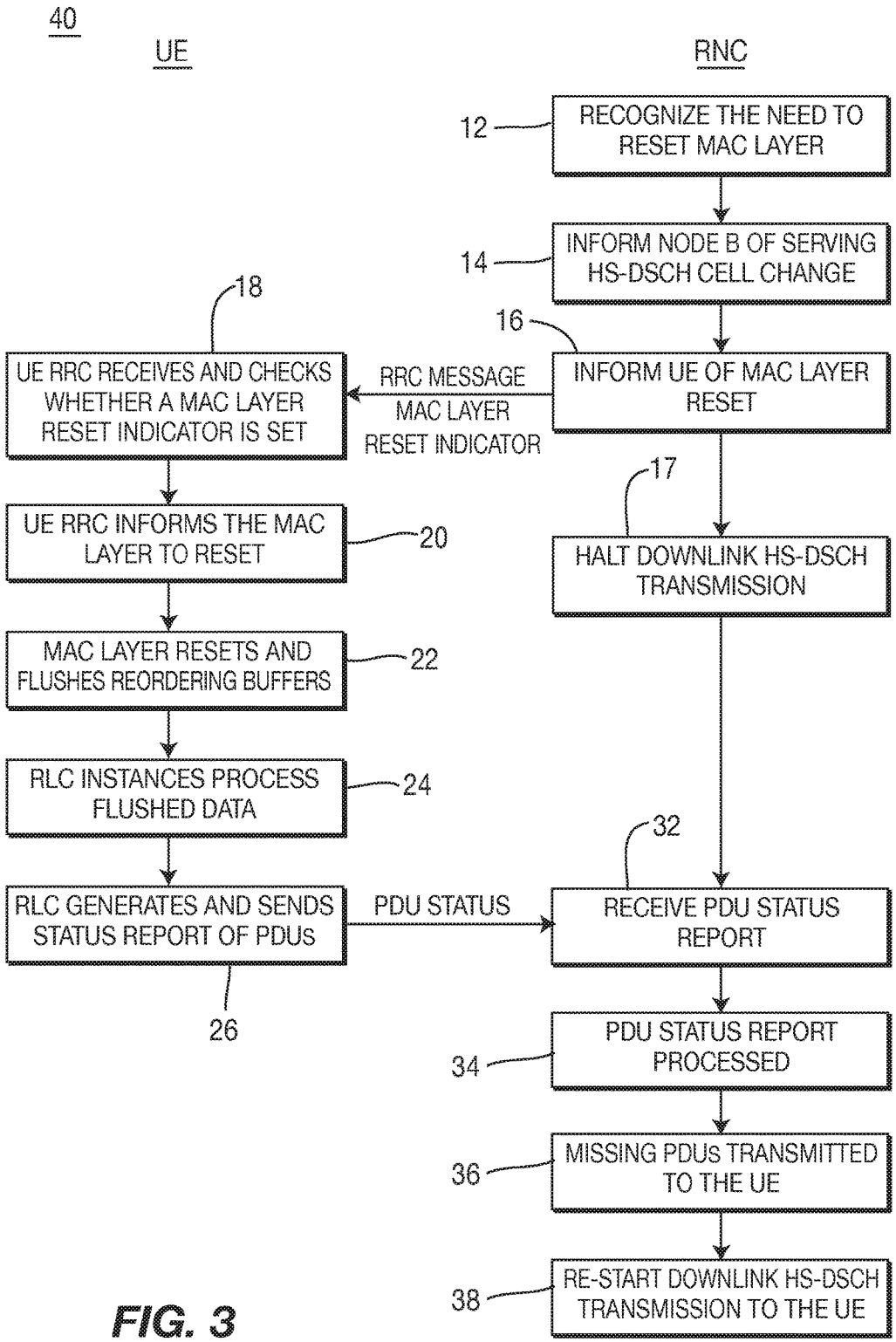
FIG. 3 is a flow diagram of a first alternative method whereby the RNC waits for a status PDU prior to initiating a transmission of new data in the target cell.

A second embodiment of the present invention comprises a method 40 for determining the status of PDU transmissions to the UE with minimal delay following a MAC layer reset condition and is shown in FIG. 3. After the RNC recognizes the need for a MAC layer reset (step 12) and the Node B and UE are notified (steps 14 and 16), the RNC halts all downlink HS-DSCH transmissions (step 17). Note that step 17 may occur in advance of step 14 or 16 without any adverse consequences. The RNC subsequently receives the PDU status report (step 32). The PDU status report indicates the PDUs lost as a result of the MAC reset and potentially additional PDUs lost in the source Node B the case of an HS-DSCH cell change. The PDU status report is then processed (step 34) and the missing PDUs are retransmitted to the UE (step 36). The RNC initiates transmission in the new cell by scheduling transmission of lost PDUs that require retransmission first. The RNC then resumes PDU transmissions (step 38) at the point where transmissions were previously stopped at step 17. Note it is also possible that steps 36 and 38 are performed simultaneously.

Figure 4:
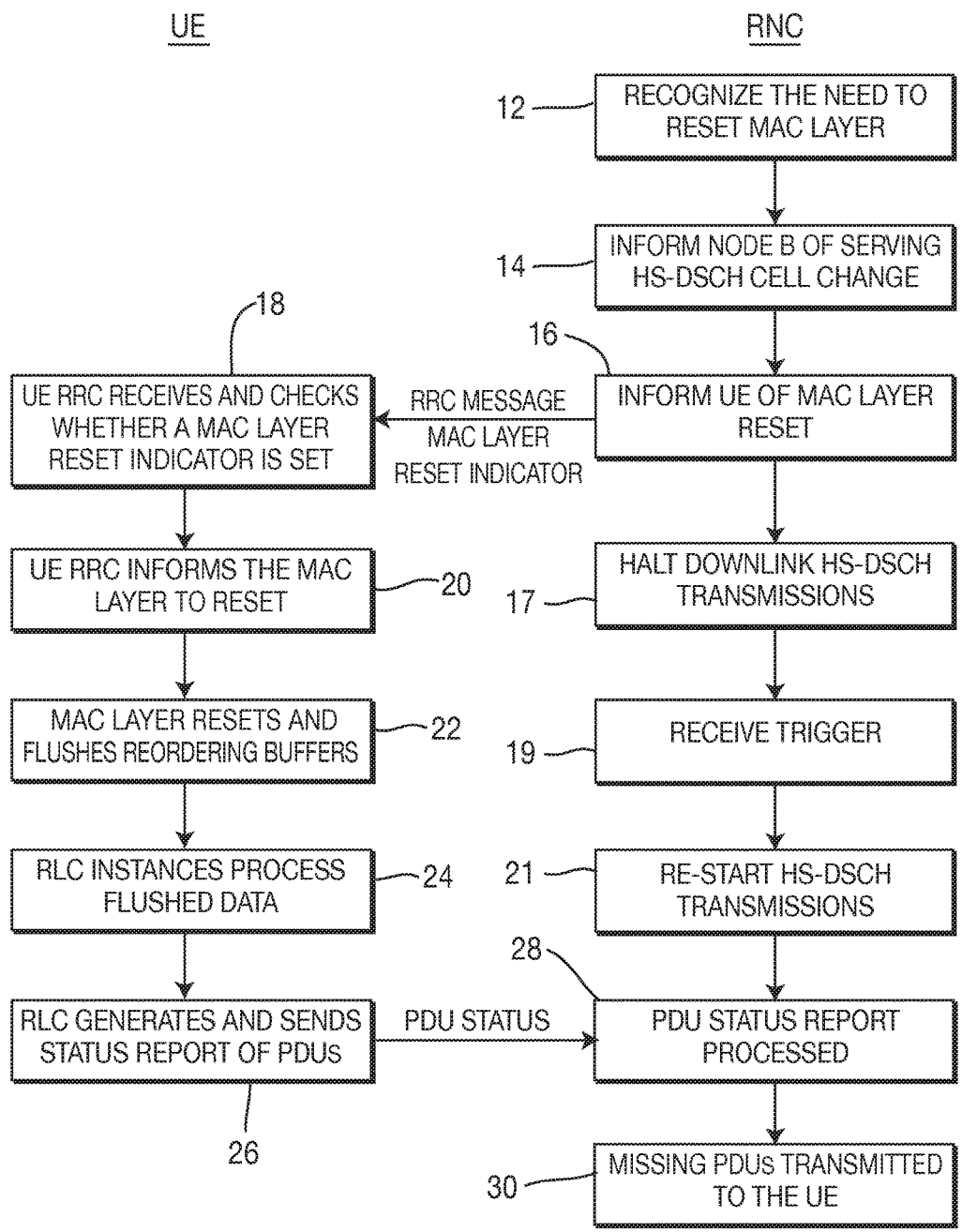
FIG. 4 is a flow diagram of a second alternative method whereby the RNC waits for a trigger prior to initiating a transmission of new data in the target cell.

Referring to FIG. 4, a third embodiment of a method 50 in accordance with the present invention is shown. This method 50 is similar to the method 40 shown in FIG. 3. However, instead of restarting the downlink HS-DSCH transmissions to the UE in response to the receipt of a PDU status report at step 32 as shown in FIG. 3, the method 50 of this embodiment of the present invention restarts transmissions upon the receipt of a "trigger", or a pre-determined event (step 19). In a first example, the trigger may comprise the establishment of the transport channel in UTRAN which, as would be understood by those of skill in the art, is accomplished by an RNC with the new "target" Node B signaling procedure. The reception in the RNC of a confirmation generated by the Node B is used as the trigger.

In a second example, the trigger may comprise reception or detection of the "in-sync" indication. Upon establishment of dedicated resources in the target Node B, an "in-sync" indication may be determined in the Node B when the assigned physical channels are determined to be available for transmission in the Node B. Indication of this event is relayed to the RNC and can then be used as a trigger.

In a third example, the trigger may comprise completion of the RRC procedure, (i.e., confirmation of the RNC reception of the UE RRC message). The RRC message signaled in step 16 results in an RRC confirmation message that is generated by the UE and sent to the RNC. When this message is received at the RNC it can be used as a trigger.

It should be noted that there are many different signals that are sent between the UE and the RNC, and any of these may be selected as desired by the user to act as the trigger in accordance with the present invention. Accordingly, the aforementioned three examples are intended to be instructive rather than restrictive. Regardless of the form of the trigger, after the trigger is received the RNC restarts HS-DSCH transmissions (step 21).

What is claimed is:

1. A method for use in a radio network controller (RNC) comprising:
    sending a radio resource control (RRC) message to a user equipment (UE) that triggers a high-speed downlink shared channel (HS-DSCH) cell change, wherein the RRC message has a MAC-hs reset indicator,
    wherein the MAC-hs reset requires the UE to disassemble MAC-hs PDUs in a reordering buffer and deliver MAC-d PDUs to a MAC-d, flush MAC-hs PDUs stored in the reordering buffer and configure the MAC-hs to receive new data.

2. The method of claim 1, wherein the HS-DSCH cell change is an inter-Node B cell change.

3. The method of claim 1, further comprising receiving one or more radio link control (RLC) status reports from the UE, wherein the RLC status report indicates the status of RLC PDUs received by the UE.

4. A radio network controller (RNC) comprising:
    a controller configured to send a radio resource control (RRC) message to a user equipment (UE) that triggers a high-speed downlink shared channel (HS-DSCH) cell change, wherein the RRC message has a MAC-hs reset indicator,
    wherein the MAC-hs reset requires the UE to disassemble MAC-hs PDUs in a reordering buffer and deliver MAC-d PDUs to a MAC-d, flush MAC-hs PDUs stored in the reordering buffer and configure the MAC-hs to receive new data.

5. The RNC of claim 4, wherein the HS-DSCH cell change is an inter-Node B cell change.

6. The RNC of claim 4, further comprising receiving one or more radio link control (RLC) status reports from the UE, wherein the RLC status report indicates the status of RLC PDUs received by the UE.

7. A method for use in a user equipment (UE) comprising:
    receiving a radio resource control (RRC) message from a radio network controller (RNC) that triggers a high-speed downlink shared channel (HS-DSCH) cell change, wherein the RRC message has a MAC-hs reset indicator;
    disassembling MAC-hs PDUs in a reordering buffer and delivering MAC-d PDUs to a MAC-d;
    flushing MAC-hs PDUs stored in the reordering buffer; and
    configuring the MAC-hs to receive new data.

8. The method of claim 7, wherein the HS-DSCH cell change is an inter-Node B cell change.

9. The method of claim 7, further comprising sending one or more radio link control (RLC) status reports, wherein the RLC status report indicates the status of RLC PDUs received by the UE.

10. A user equipment (UE) comprising:
    a controller configured to receive a radio resource control (RRC) message from a radio network controller (RNC) that triggers a high-speed downlink shared channel (HS-DSCH) cell change, wherein the RRC message has a MAC-hs reset indicator;
    the controller further configured to disassemble MAC-hs PDUs in a reordering buffer and deliver MAC-d PDUs to a MAC-d;
    the controller further configured to flush MAC-hs PDUs stored in the reordering buffer; and
    the controller further configured to configure the MAC-hs to receive new data.

11. The UE of claim 10, wherein the HS-DSCH cell change is an inter-Node B cell change.

12. The UE of claim 10, wherein the controller is further configured to send one or more radio link control (RLC) status reports that indicate the status of RLC PDUs received by the UE.

* * * * *